(12) United States Patent
Vinson et al.

(10) Patent No.: US 11,386,646 B2
(45) Date of Patent: Jul. 12, 2022

(54) PLATFORM FOR GENERATING INTERACTIVE EXPERIENCES AT SPORTS VENUES

(71) Applicant: Accenture Global Solutions Limited, Dublin (IE)

(72) Inventors: David William Vinson, San Francisco, CA (US); Matthew Thomas Short, San Jose, CA (US); Alex Kass, Palo Alto, CA (US); Mary Elizabeth Hamilton, San Mateo, CA (US); Sunil Shettigar, Santa Clara, CA (US); Nikolas Martelaro, San Francisco, CA (US); Kahlil Gibran Fitzgerald, Richmond, CA (US)

(73) Assignee: Accenture Global Solutions Limited, Dublin (IE)

( * ) Notice: Subject to any disclaimer, the term of this patent is extended or adjusted under 35 U.S.C. 154(b) by 85 days.

(21) Appl. No.: 17/028,688

(22) Filed: Sep. 22, 2020

(65) Prior Publication Data
US 2021/0089770 A1  Mar. 25, 2021

Related U.S. Application Data

(60) Provisional application No. 62/904,902, filed on Sep. 24, 2019.

(51) Int. Cl.
*G06V 20/00* (2022.01)
*G10L 15/22* (2006.01)
*G06V 40/10* (2022.01)
*G06V 40/20* (2022.01)

(52) U.S. Cl.
CPC .............. *G06V 20/00* (2022.01); *G06V 40/10* (2022.01); *G06V 40/20* (2022.01); *G10L 15/22* (2013.01)

(58) Field of Classification Search
CPC ........ G06V 20/00; G06V 40/10; G06V 40/20; G10L 15/22
See application file for complete search history.

(56) References Cited

U.S. PATENT DOCUMENTS

2017/0041412 A1* 2/2017 Werner ................ G06F 16/2291
2019/0205645 A1* 7/2019 Bates ...................... G06T 11/60

OTHER PUBLICATIONS

Pickering et al., "Toward a mechanistic psychology of dialogue," Behavioral and Brain Sciences, May 2004, 27(2):169-226.

* cited by examiner

*Primary Examiner* — Robert J Michaud
(74) *Attorney, Agent, or Firm* — Fish & Richardson P.C.

(57) ABSTRACT

This document describes multi-modal platforms that receive multi-modal inputs and generates interactive experiences based on the inputs. In one aspect, a method includes receiving input data comprising one or more images of an area of a sports venue. A person is detected in the one or more images. Apparel information including at least one of a team identifier or player identifier on athletic apparel of the person is identifier in the one or more images. An interactive experience that includes a particular sports-related character is selected based at least on the apparel information. The interactive experience is initiated on an interactive display. The interactive experience includes video of the particular sports-related character delivering a message to the person.

20 Claims, 3 Drawing Sheets

PLATFORM FOR GENERATING INTERACTIVE EXPERIENCES AT SPORTS VENUES

CROSS REFERENCE TO RELATED APPLICATIONS

This application claims the benefit under 35 U.S.C. § 119(e) of U.S. Patent Application No. 62/904,902, entitled "MULTI-MODAL PLATFORM FOR INTERACTIVE EXPERIENCES," filed Sep. 24, 2019. The disclosure of the foregoing application is incorporated herein by reference in its entirety for all purposes.

TECHNICAL FIELD

This specification relates to a platform that receives multi-modal inputs and generates interactive experiences based on the inputs.

BACKGROUND

Some platforms can receive, interpret, and respond to voice commands. For example, intelligent virtual assistants can perform actions in response to voice commands or questions. These assistants can use natural language processing to understand the speech input and then map the speech input to an executable command.

SUMMARY

This specification generally describes a platform that receives multi-modal inputs and generates interactive experiences based on the inputs.

In general, one innovative aspect of the subject matter described in this specification can be embodied in methods that include the actions of receiving input data including one or more images of an area of a sports venue; detecting, in the one or more images, a person; identifying, in the one or more images, apparel information including at least one of a team identifier or player identifier on athletic apparel of the person; selecting, based at least on the apparel information and from multiple candidate interactive experiences, an interactive experience comprising a particular sports-related character; and initiating the interactive experience on an interactive display, the interactive experience comprising video of the particular sports-related character delivering a message to the person. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, the interactive experience includes engaging, by the particular sports-related character, in a conversation with the person. Aspects can include detecting voice input from the person and generating, using the particular sports-related character, a response to the person based on the voice input.

In some aspects, selecting the interactive experience can include determining that a first team identified by the team identifier is competing against a second team at the sports venue and selecting, as the particular sports-related character, a player from the first team or the second team. In some aspects, selecting the player from the first team or the second team includes determining that a player identified by the player identifier has a rival on the second team and selecting, as the particular sports-related character, the rival.

Some aspects include detecting a mood of the person based on the one or more images. Selecting a player from the first team or the second team includes selecting the player from the first team or the second team based on the mood of the person. Selecting a player from the first team or the second team can include determining whether the sports venue is a home to the first team; whenever the sports venue is a home venue for the first team, selecting a player from the first team; and whenever the sports venue is a home venue for the second team, selecting a player from the second team.

In some aspects, the interactive experience includes adjusting the particular sports-related character in the video such that the particular sports-related character appears to be looking at the person.

The subject matter described in this specification can be implemented in particular embodiments and may result in one or more of the following advantages. The multi-modal platform enables a machine, e.g., an interactive poster with one or more digital sports-related characters, to communicate effectively and interact with a person. Using contextual understanding in combination with perception of an environment enables the platform to generate interactive experiences that are adapted to the context and to the person, thereby improving user experience and increasing user engagement. By mapping contextual states with interactive experiences, the platform can more quickly and more accurately select and manage interactive experiences in real-time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a platform that receives multi-modal inputs and generates interactive experiences based on the inputs. The platform can be part of an interactive display, such as an interactive poster or large stadium screen, that has a display in which animated video of a sport-related character is presented. The character can be a fictional character, e.g., an animated character, or a virtual recreation or video of real character, e.g., video of a real athlete. The platform can manipulate the character to provide an interactive experience for people at a sports venue.

The platform can select a character for the interactive experience based on inputs related to the one or more persons interacting with, or that are near or in front of, the interactive display. For example, the platform can select a character based on the apparel being worn by the person(s). In this example, the platform can select a character based on a team identifier, e.g., team name, logo, or color scheme, and/or based on a player identifier, e.g., player name or number. The platform can also use additional contextual information to select the character, such as a detected mood of the person(s), the sports venue at which the interactive display is located, the relative number of people wearing each team's or player's apparel, and/or the location of the interactive display within the sports venue. The platform can also select the interactive experience using the same or similar information.

Figure 1:
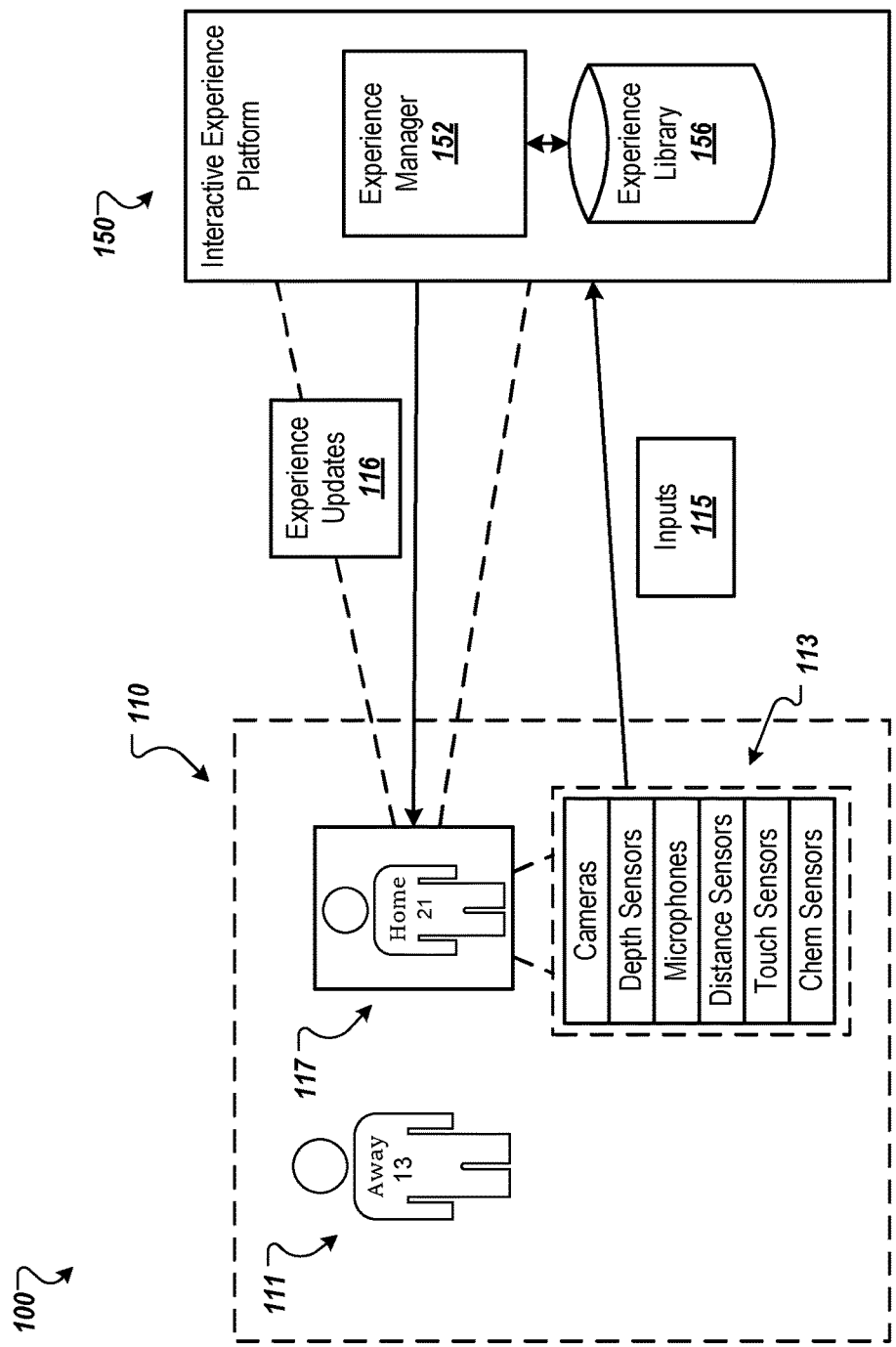
FIG. 1 is an example environment in which an interactive experience platform provides interactive experiences based on multi-modal inputs.

FIG. 1 is an example environment 100 in which an interactive experience platform 150 provides interactive experiences based on multi-modal inputs. The interactive experience platform 150, which can be implemented using one or more processors or computers, can be part of, or in data communication with an interactive display 117 located in a sports venue 110. The interactive display 117 can be in the form of, or part of, an interactive poster. The combination of the interactive display 117, a set of sensors 113, and the interactive experience platform 150 form an interactive experience system, which can all be implemented in an interactive poster.

The sports venue 110 can be a stadium, arena, court (e.g., tennis court), field (e.g., baseball field, or other venue that hosts competitive athletic events. As the interactive display may be mobile, the interactive experience platform 150 can receive and store data indicating the particular sports venue 110, the type of the sports venue 110, the athletic event being hosted at the athletic venue 110, the home team or home athlete of the sports venue 110, the particular teams or athletes competing on a particular day or at a particular time (e.g., in the form of a schedule), and/or other information about the sports venue 110.

The interactive experience platform 150 can provide interactive experiences for people at the sports venue 110 using the interactive display 117. An interactive experience can include, for example, a sports-related character engaging in conversation with a person or group of people. For example, an interactive experience can include multiple scripted conversations from which a particular scripted conversation can be selected based on contextual information. Although scripted, the interactive experience platform 150 can take the conversation in different directions based on responses from the person(s) interacting with the interactive display 117 as described in more detail below. In this way, people can have unique experiences with sports-related characters depending on context and their interactions (e.g., actions or responses) with the interactive display 117.

An interactive experience can include pre-recorded video, e.g., video of a particular athlete or highlight. The video can be part of a conversation. For example, the video can be played before, at some point during, or to conclude a conversation of an interactive experience.

The interactive experience platform 150 can store information for the interactive experiences in an experience library 156. The interactive experience library 156 can store, for each interactive experience, one or more scripted conversations and one or more sports-related characters that can be selected for the interactive experience. The interactive experience library 156 can also include data mapping interactive experiences, scripted conversations of interactive experiences, and/or sports-related characters to particular contextual states. Each contextual state can represent a combination of inputs. For example, a contextual state may be "happy fan of away team" or "more home fans than away fans." In this way, the interactive experience platform can determine, before and during an interactive experience, a contextual state based on multi-modal inputs and manage and/or adjust the interactive experience based on the current state and changes in states.

The interactive experience platform 150 includes an experience manager 152 that can select an interactive experience (including selecting a sports-related character for the interactive experience), determine the contextual state, and/or manage the interactive experience based on input data 115 received from the set of sensors 113. For example, the interactive experience platform 150 can fuse or otherwise combine inputs received from the sensors 113 to select the interactive experience, determine the contextual state, and manage the interactive experience.

The sensors 113 can include, for example, one or more cameras, e.g., one or more cameras, e.g., one or more RBG cameras, one or more depth cameras, one or more microphones, one or more distance or depth sensors, one or more touch sensors, and/or one or more chemical sensors. The interactive experience manager 152 can continuously or periodically obtain the input data 115 from the sensors 113 and manage the interactive experience based on the input data 115.

The interactive experience can select an interactive experience and/or a particular sports-related character for the interactive experience based on team and/or player identifiers detected on apparel, e.g., shorts, jerseys, hats, jackets, etc., of one or more persons captured by the cameras. A team identifier can be a name of the team, a logo of the team, or a color scheme for the team. A player identifier can be a name or jersey number of an athlete. For example, if a particular player identifier is detected, the interactive experience manager 152 can select the particular player, a rival of the particular player, or player that will be playing opposite the particular player in the sporting event happening that day based on additional contextual information. The additional contextual information in this example can include whether the particular player has a rival or a rival on the opposing team and the opposing team that day.

The interactive experience manager 152 can also use other data to select and/or manage an interactive experience such that the interactive experience is customized to a person or group of people. For example, the interactive experience manager 152 can use information about particular people to customize interactive experience for those people. In a particular example, a fan of a team may provide, for the interactive experience platform 150 information indicating the teams and athletes that the person likes. In this way, the interactive experience manager 152 can select players from those teams or the particular athletes as the sports-related characters of the interactive experiences.

The interactive experience manager 152 can map contextual information to particular contextual states. For example, the interactive experience manager 152 can combine the input data 115 received from multiple sensors can map the input data to a matching or similar contextual state. In a particular example, the interactive experience manager 152 may detect a person wearing apparel of the home team and that the person is in a happy mood. In this example, the interactive experience manager 152 can map this information to a "happy home team fan" contextual state and select, based on this state, an interactive experience that encourages the person to cheer for the home team or hype the person up for the sporting event.

The interactive experience manager 152 can initiate an interactive experience based on the input data, e.g., in response to detecting one or more persons in images captured by the cameras. Throughout the interactive experience, the interactive experience manager 152 can send interactive experience updates 116 to update the character of the experience, e.g., based on updated input data. For example, if the person provides a response to a question, the interactive experience manager 152 can manipulate the character to respond, e.g., with a statement, question, or by performing an action based on the person's response.

To illustrate how the interactive experience platform 150 provides interactive experiences, the following examples are provided. In one example, the cameras can capture images of people standing or walking in front of the interactive display 117. The interactive experience manager 152 can evaluate the images to determine whether any of the people are wearing athletic apparel for a team or athlete. For example, the interactive experience manager 152 can compare text, logos, and/or color schemes on the people's apparel to team names, player numbers, and/or team color schemes to determine whether and/or how many of the people are fans of a particular athlete or team. Based on this information, the interactive experience manager 152 can select an interactive experience and/or sports-related character for the experience.

For example, assume that the sports venue 110 is hosting a basketball game between a home team and an away team. The interactive experience manager 152 can identify a person 111 wearing a shirt for the away team with the number 13 in images captured by the camera, as shown in FIG. 1. Since this person is wearing apparel of the away team, the interactive experience manager 152 may select an interactive experience that playfully taunts the person 111 using a virtual recreation or video of a player on the home team, as shown in the interactive display 117 of FIG. 1. For example, the interactive experience may initially engage the person 111 by manipulating the character representing the player on the home team to look towards the person 110 and make a comment about the away team or the player that wears the number 13 for the away team.

In another example, if the player that wears the number 13 for the away team has a rival on the home team, the interactive experience may use a character to ask the person 111 if they recall a highlight in which the rival made a great play over the away team's player and then play a video of the highlight. In these examples, the interactive experience managers 152 can use the apparel that people are wearing along with the teams that are competing and which team is the home team in determining a contextual state and select interactive experiences and the sports-related characters for the interactive experiences. In the previous example, the contextual state may be "fan of away team" or "fan of rival of player 21."

The interactive experience manager 152 can also detect the mood of the people and select and manage the interactive experience based on the mood. For example, if the fan of the away team in the previous example is detected to be happy, the previous interactive experience may be selected. However, if the fan of the away team is detected to be upset, the interactive experience manager 152 may select a different interactive experience that would not upset the fan more.

The interactive experience manager 152 can detect, in images captured by the camera(s), products being carried by a person. For example, the interactive experience manager 152 may detect that the person is carrying a souvenir. The interactive experience manager 152 can select or manage an interactive experience that asks the person about or compliments the person based on the souvenir.

Another example interactive experience may be challenging a person to a virtual game. If the person succeeds at the virtual game, the interactive experience manager 152 can award the person with a chance to compete in another game, e.g., on the field during a break in a game.

The interactive experience manager 152 can also use multiple images of a person over a particular time period and information about the sporting event to select or customize an interactive experience. For example, the interactive experience manager 152 may detect a person going to a restroom. In addition, the interactive experience manager 152 may receive information about events within the sporting event or monitor crowd noise. If an event occurred or the crowd noise exceeded a threshold with the person was in the restroom and the person approaches the interactive display 117 after using the restroom, the interactive experience manager 152 can select an interactive experience that shows a highlight. This interactive experience can start by telling the person that they missed an event, e.g., a touchdown or homerun. If the person looks towards the interactive display 117, the interactive experience manager 152 can transition to presenting a video replay of the event.

The interactive experience manager 152 can also adjust an interactive experience or select a different interactive experience based on the input data 115. For example, playfully taunting a fan of an away team may draw more of the home team's fans to the interactive display 117. In this example, the interactive experience manager 152 can detect that there are more home team fans than away team fans and transition to an interactive experience that is more directed to the home team fans, e.g., including using a character related to the home team.

The interactive experience manager 152 can also take into account the location of the interactive display 115 in the sports venue 110. For example, if the interactive display 117 is near concession stands, the interactive experience manager 152 can select interactive experiences related to food, with conversations that include asking a person about their favorite foods and recommending an item at the concession stand based on the person's response. If the person is wearing apparel of the away team, the interactive experience manager 152 can also provide local restaurant recommendations or provide silly or nonsensical recommendations.

The interactive experience manager 152 can also detect or estimate the age of the person and select an interactive experience or character for the interactive experience based on the age. For example, an animated character may be provided for a child whereas a virtual recreation of player may be provided for an adult.

Figure 2:
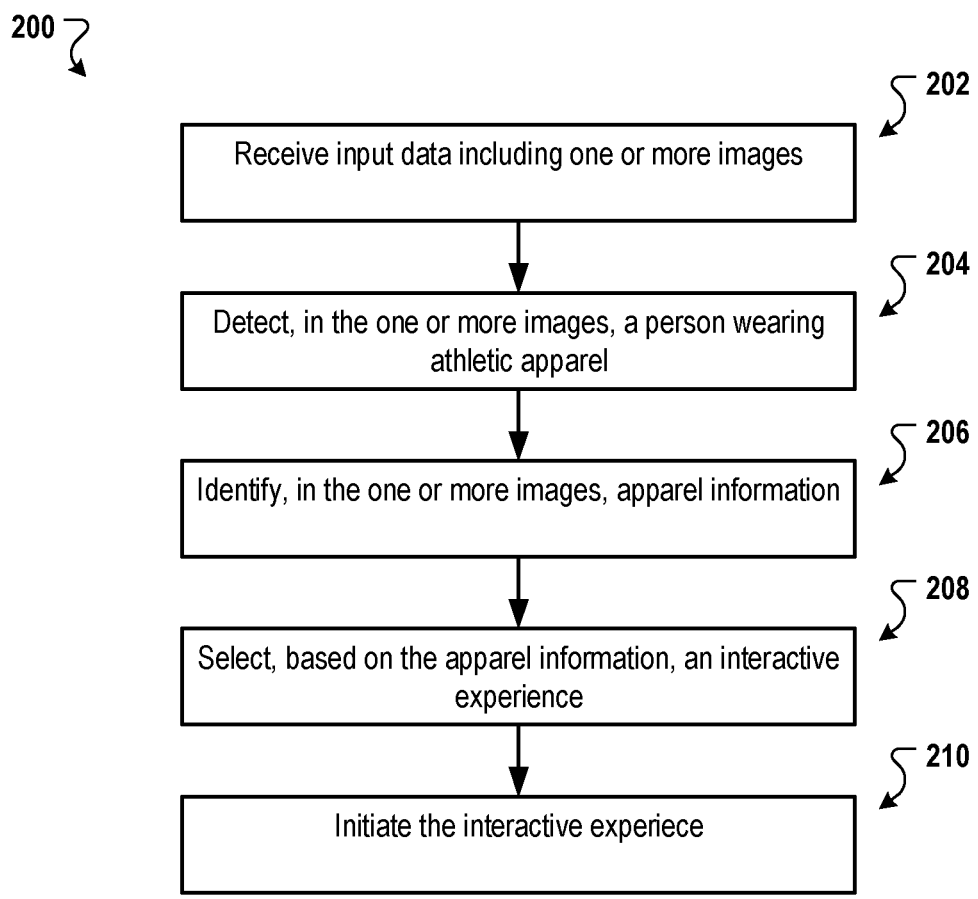
FIG. 2 is a flow diagram of an example process for providing an interactive experience based on multi-modal inputs.

FIG. 2 is a flow diagram of an example process 200 for providing an interactive experience based on multi-modal inputs. The process 200 can be performed, for example, by the interactive experience platform 150.

The interactive experience platform 150 receives input data (202). The input data can include one or more images of an area of a sports venue. For example, as described above, the interactive experience platform 150 can receive images from one or more cameras installed on or at interactive display. The interactive experience platform 150 can also receive other input data, such as sound input (e.g., voice input), touch input, depth sensors, etc.

The interactive experience platform 150 detects, in the one or more images, a person (204). For example, the interactive experience platform 150 can use object recognition techniques to detect one or more persons in the one or more images.

The interactive experience platform 150 identifies, in the one or more images, apparel information that includes a team identifier or player identifier on athletic apparel being worn by the person (206). The interactive experience platform 150 can use text recognition techniques to recognize text, if any on the apparel and compare the text to team names, player names, and/or player numbers. The interactive experience platform 150 can also use object recognition techniques to identify apparel that includes athletic insignia, patterns, logos, color schemes, etc. The interactive experience platform 150 can compare this information to corresponding information of athletic teams.

The interactive experience platform 150 selects, based on the apparel information, an interactive experience from multiple candidate interactive experiences (208). As described above, the interactive experience platform 150 can use multiple types of input data, including this apparel information, to select an interactive experience and/or a particular sports-related character for the interactive experience.

The interactive experience platform 150 can select the sports-related character from a set of candidate sports-related characters specified for the interactive experience. The set of candidate characters can differ based on the sports venue, e.g., based on the home team(s) for the venue or based on the particular teams participating in a sporting event that day.

To select the character, the interactive experience platform 150 can determine that a first team identified by the team identifier is competing against a second team at the sports venue. In this example, the interactive experience platform 150 can select, as the particular sports-related character, a player from the first team or the second team. For example, the interactive experience platform 150 can determine that a player identified by the player identifier has a rival on the second team and select, as the particular sports-related character, the rival.

In selecting the character, the interactive experience platform 150 can detect a mood of the person based on the one or more images. In this example, the interactive experience platform can select the player from the first team or the second team based on the mood of the person.

The interactive experience platform 150 can select the character based on which team is the home team and which team is the away team. For example, the interactive experience platform 150 can receive data indicating the home team and the away team. The interactive experience platform 150 can typically select a character from the home team, but that can vary based on contextual information, e.g., if there are more fans of the away team detected near or in front of the interactive display.

The interactive experience platform 150 initiate the selected interactive experience using the selected sports-related character (210). The interactive experience can include video of the sports-related character delivering a message to the person. This message can be a message to get the person to interact with an interactive display that is playing the video.

The interactive experience platform can generate and adjust the sports-related character in the video such that the character appears to be looking at the person, and/or gesturing towards the person. In this way, the interactive experience can engage the person to interact with the character.

The interactive experience platform 150 can continue the interactive experience by monitoring the input data and responding to the input data. For example, updated input data can include updated images of the area, including the person if still in the area, and sound input. As the interactive experience can include a scripted conversation, the interactive experience platform can manage the interactive experience by responding to voice input from the user and following the script.

The interactive experience can include engaging, by the particular sports-related character, in a conversation with the person. During the interactive experience, the interactive experience platform can detect voice input from the person and generate, using the particular sports-related character, a response to the person based on the voice input. In this way, the interactive experience platform 150 can continue the conversation with the person based on the person's responses and update the character accordingly. As the person's responses can differ from person to person and the context can change, the interactive experience can be different for different people and different changes in context during the interactive experience.

The interactive experience platform can also monitor for changes in contextual states and manage the interactive experience based on the change or select a different interactive experience based on the change in state. For example, if the person leaves the area and another person approaches interactive display, the interactive experience platform 150 can select a different interactive experience that is better adapted to the context of the new person.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the user device, which acts as a client. Data generated at the user device, e.g., a result of the user interaction, can be received from the user device at the server.

Figure 3:
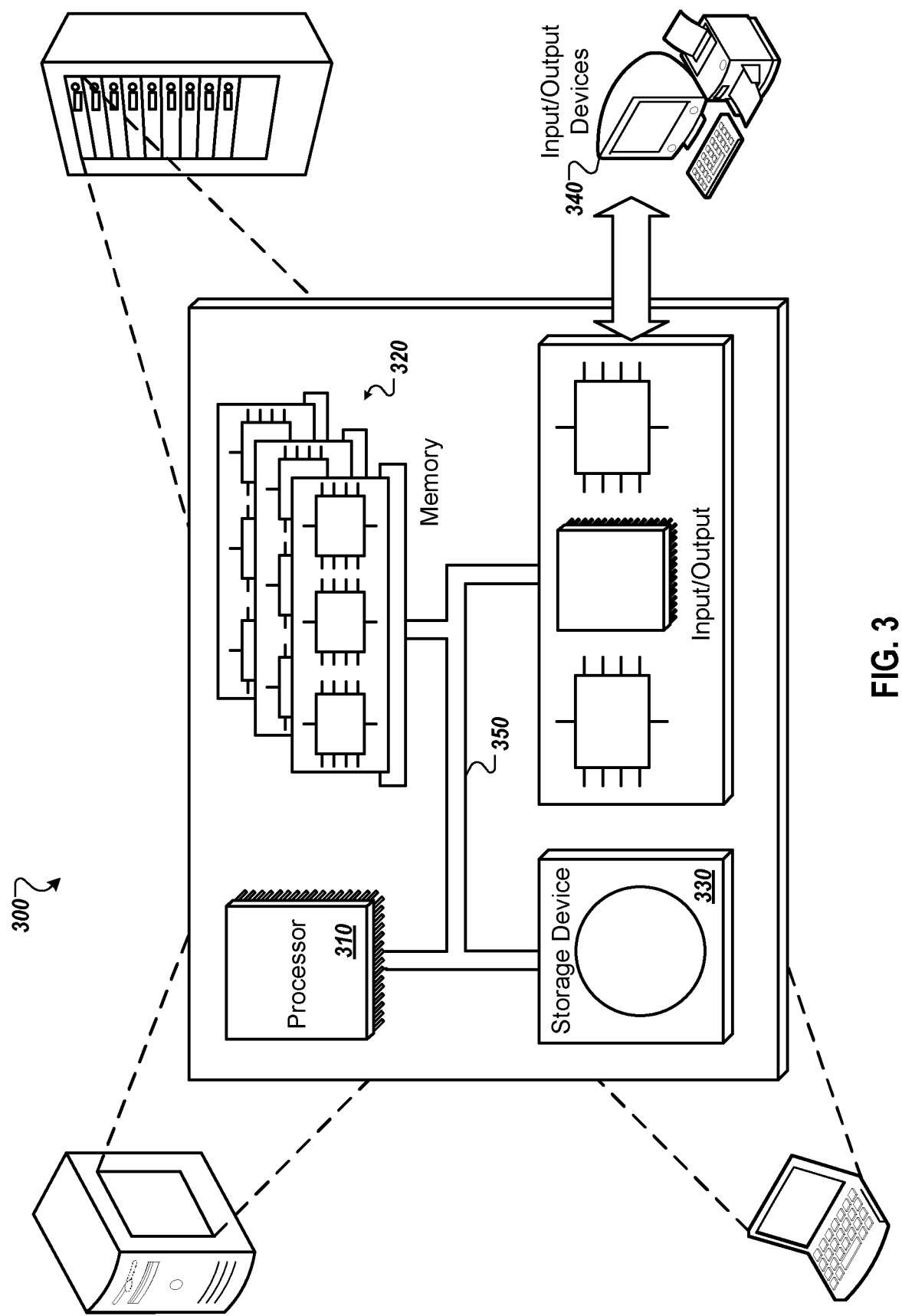
FIG. 3 is a block diagram of a computing system that can be used in connection with computer-implemented methods described in this document.

An example of one such type of computer is shown in FIG. 3, which shows a schematic diagram of a computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   generating, by one or more sensors, input data comprising one or more images of a person standing near an interactive display in a sports venue;
   identifying, in the one or more images, apparel information comprising at least one of a team identifier or player identifier on athletic apparel of the person that is standing near the interactive display;
   accessing, from an interactive experience library, multiple candidate interactive experiences that can be selected for output on the interactive display to engage the person standing near the interactive display;
   selecting, based at least on the apparel information and from among the multiple candidate interactive experiences, the interactive experience comprising a virtual recreation of a real or fictional particular sports-related character; and
   providing, in real time to generating the input data, the interactive experience for output on the interactive display, the interactive experience comprising video of the virtual recreation of the particular sports-related character delivering a message to the person standing near the interactive display.

2. The computer-implemented method of claim 1, wherein providing the interactive experience comprises engaging, by the virtual recreation of the particular sports-related character, in dialogue with the person, and wherein the method further comprises:
   detecting voice input from the person that is standing near the interactive display; and
   generating, using the virtual representation of the particular sports-related character, a response to the person based on the voice input.

3. The computer-implemented method of claim 1, wherein selecting the interactive experience comprises:
   determining that a first team identified by the team identifier is competing against a second team at the sports venue;
   selecting, as the particular sports-related character, a player from the first team or the second team; and
   obtaining the virtual recreation of the particular sports-related character.

4. The computer-implemented method of claim 3, wherein selecting the player from the first team or the second team comprises:
   determining that a player identified by the player identifier has a rival player on the second team; and
   selecting, as the particular sports-related character, the rival player.

5. The computer-implemented method of claim 3, further comprising detecting a mood of the person based on the one or more images, wherein selecting a player from the first team or the second team comprises selecting the player from the first team or the second team based on the detected mood of the person.

6. The computer-implemented method of claim 3, wherein selecting a player from the first team or the second team comprises:
   determining whether the sports venue is a home to the first team; and
   whenever the sports venue is a home venue for the first team, selecting a player from the first team; and
   whenever the sports venue is a home venue for the second team, selecting a player from the second team.

7. The computer-implemented method of claim 1, wherein the interactive experience comprises the adjusting virtual recreation of the particular sports-related character in the video such that the particular sports-related character appears to be looking at the person.

8. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
   generating, by one or more sensors, input data comprising one or more images of a person standing near an interactive display in a sports venue;
   identifying, in the one or more images, apparel information comprising at least one of a team identifier or player identifier on athletic apparel of the person that is standing near the interactive display;
   accessing, from an interactive experience library, multiple candidate interactive experiences that can be selected for output on the interactive display to engage the person standing near the interactive display;
   selecting, based at least on the apparel information and from among the multiple candidate interactive experiences, the interactive experience comprising a virtual recreation of a real or fictional particular sports-related character; and providing, in real time to generating the input data, the interactive experience for output on the interactive display, the interactive experience comprising video of the virtual recreation of the particular sports-related character delivering a message to the person standing near the interactive display.

9. The computer-implemented system of claim 8, wherein providing the interactive experience comprises engaging, by the virtual recreation of the particular sports-related character, in dialogue with the person, and wherein the operations further comprise:

detecting voice input from the person that is standing near the interactive display; and generating, using the virtual representation of the particular sports-related character, a response to the person based on the voice input.

10. The computer-implemented system of claim 8, wherein selecting the interactive experience comprises:

determining that a first team identified by the team identifier is competing against a second team at the sports venue; and selecting, as the particular sports-related character, a player from the first team or the second team.

11. The computer-implemented system of claim 10, wherein selecting the player from the first team or the second team comprises:

determining that a first team identified by the team identifier is competing against a second team at the sports venue;

selecting, as the particular sports-related character, a player from the first team or the second team; and obtaining the virtual recreation of the particular sports-related character.

12. The computer-implemented system of claim 10, wherein the operations further comprise detecting a mood of the person based on the one or more images, wherein selecting a player from the first team or the second team comprises selecting the player from the first team or the second team based on the detected mood of the person.

13. The computer-implemented system of claim 10, wherein selecting a player from the first team or the second team comprises:

determining whether the sports venue is a home to the first team; and whenever the sports venue is a home venue for the first team, selecting a player from the first team; and whenever the sports venue is a home venue for the second team, selecting a player from the second team.

14. The computer-implemented system of claim 8, wherein the interactive experience comprises the adjusting the virtual recreation of the particular sports-related character in the video such that the particular sports-related character appears to be looking at the person.

15. A non-transitory, computer-readable medium storing one or more instructions executable by a computer system to perform operations comprising:

generating, by one or more sensors, input data comprising one or more images of a person standing near an interactive display in a sports venue;

identifying, in the one or more images, apparel information comprising at least one of a team identifier or player identifier on athletic apparel of the person that is standing near the interactive display;

accessing, from an interactive experience library, multiple candidate interactive experiences that can be selected for output on the interactive display to engage the person standing near the interactive display;

selecting, based at least on the apparel information and from among the multiple candidate interactive experiences, the interactive experience comprising a virtual recreation of a real or fictional particular sports-related character; and providing, in real time to generating the input data, the interactive experience for output on the interactive display, the interactive experience comprising video of the virtual recreation of the particular sports-related character delivering a message to the person standing near the interactive display.

16. The non-transitory, computer-readable medium of claim 15, wherein providing the interactive experience comprises engaging, by the virtual recreation of the particular sports-related character, in dialogue with the person, and wherein the operations further comprise:

detecting voice input from the person that is standing near the interactive display; and generating, using the virtual representation of the particular sports-related character, a response to the person based on the voice input.

17. The non-transitory, computer-readable medium of claim 15, wherein selecting the interactive experience comprises:

determining that a first team identified by the team identifier is competing against a second team at the sports venue;

selecting, as the particular sports-related character, a player from the first team or the second team; and obtaining the virtual recreation of the particular sports-related character.

18. The non-transitory, computer-readable medium of claim 17, wherein selecting the player from the first team or the second team comprises:

determining that a player identified by the player identifier has a rival player on the second team; and selecting, as the particular sports-related character, the rival player.

19. The non-transitory, computer-readable medium of claim 17, wherein the operations further comprise detecting a mood of the person based on the one or more images, wherein selecting a player from the first team or the second team comprises selecting the player from the first team or the second team based on the detected mood of the person.

20. The non-transitory, computer-readable medium of claim 17, wherein selecting a player from the first team or the second team comprises:

determining whether the sports venue is a home to the first team; and whenever the sports venue is a home venue for the first team, selecting a player from the first team; and whenever the sports venue is a home venue for the second team, selecting a player from the second team.

* * * * *